G. C. ELLIOTT.
COTTON HARVESTER.
APPLICATION FILED OCT. 22, 1908.

964,958.

Patented July 19, 1910.
5 SHEETS—SHEET 3.

G. C. ELLIOTT.
COTTON HARVESTER.
APPLICATION FILED OCT. 22, 1908.

964,958.

Patented July 19, 1910.
5 SHEETS—SHEET 4.

Witnesses
R. A. White
Harry R. L. White

Inventor
George Crawford Elliott
By Jno. G. Elliott Atty.

G. C. ELLIOTT.
COTTON HARVESTER.
APPLICATION FILED OCT. 22, 1908.

964,958.

Patented July 19, 1910.
5 SHEETS—SHEET 5.

Witnesses
R. A. White.
Harry R. Levitte.

Inventor
George Crawford Elliott
By Jno. G. Elliott Atty

UNITED STATES PATENT OFFICE.

GEORGE CRAWFORD ELLIOTT, OF CHICAGO, ILLINOIS, ASSIGNOR TO NATIONAL COTTON HARVESTER COMPANY, OF CHICAGO, ILLINOIS, A CORPORATION OF ILLINOIS.

COTTON-HARVESTER.

964,958.   Specification of Letters Patent.   Patented July 19, 1910.

Application filed October 22, 1908. Serial No. 458,985.

*To all whom it may concern:*

Be it known that I, GEORGE CRAWFORD ELLIOTT, citizen of the United States, and a resident of Chicago, in the county of Cook and State of Illinois, have invented certain new and useful Improvements in Cotton-Harvesters, of which the following is a full, clear, and exact specification.

This invention relates to improvements in cotton harvesters of straddle-row character in which the picker-stems for gathering the ripe cotton have a continuous rotation about their respective axes for gathering the ripe cotton from the burst bolls and an end thrust into and out of the cotton bush as the harvester is advanced over the row of bushes.

The prime object of my invention is to sustain and actuate the picker-stems in series by means of supporting endless belts inclined upwardly and backwardly from their lower ends in such a manner that said picker-stems when in operation during the advance of the machine, will rise through the cotton in a vertical line, and in moving forward with reference to the bush, engage and thereby produce the least possible injury to the bloom of the unripe cotton bolls in all stages from greenness to ripeness, and at the same time move in the most effective direction for entirely stripping ripe cotton from the bushes varying in height.

A further object of my invention is to have the picker-stem so supported and actuated that there may be a perfect discharge of the gathered cotton therefrom into a suitable receptacle carried by and removable from the machine.

A still further object of my invention is to provide means by which the structure directly supporting the pickers may, as a whole, be adjusted with reference to unevenness in the ground to which the traction wheels are subject and also with reference to bushes varying in height.

Another object of my invention is to provide a simple and effective means under the control of the driver or operator of the machine by which the picker-stems may be maintained against endwise movement without stopping either their rotative movement or the movement of their supports during the bodily forward movement of the machine.

A further object of my invention is to provide a simple and effective means by which an air-blast device may be successfully employed and automatically actuated, through the forward movement of the machine, to deliver into a receptacle supported by the machine, the cotton automatically discharged from the picker-stems as fast as such discharge occurs.

A further object of my invention is to have the cotton picking mechanism at each side of the machine capable of being separately or simultaneously disengaged from its actuating mechanism and also the actuating mechanism for delivering the cotton to the removable receptacle directly under the control of the seated attendant of the machine, whereby he may stop the entire cotton picking mechanism, or without stopping it shift and maintain the picker-stems out of engagement with the cotton bush during the forward movement of the machine, or may stop all operating mechanism without bringing the machine to a standstill.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

In said drawings.

Similar characters of reference indicate the same parts in the several figures of the drawings.

The frame of the machine consists of a bed or bottom 11, side bars 12—12, and end bars 13—13, the bottom being provided with suitable openings for the connections of the power actuating shafts above the same and for projecting the picker stem mechanism and its supports, hereinafter described, therethrough, there being bolted to the underside of the bed 11, (see Fig. 9), bent hangers 14—14 forming bearings for the rear axle 15, supported by ground wheels 16—16; the forward end of the frame of the machine being in turn supported by traction wheels 17—17 on an axle 18 journaled in the ends of a U-shaped bar 19, between which and the bed is a fifth wheel 20, the lower portion of which is supported by the bar 19 and the upper portion being a bracket 21 secured to the bottom or bed 11 by bolts or other suitable means, not shown.

Secured to the rear axle between the hangers 14—14 and the wheels 16—16 are power sprockets 22—23, respectively connected by sprocket chains 24—25, (see Fig. 9), with sprocket pinions 26 and 27 on separate shafts 28 and 29, the shaft 28 being journaled at one end in a box 30 on the adjacent side bar 12, and at its other end in a box 31 in a standard 32 supported from the bed 11, the shaft 29 being likewise journaled in a box 33 supported by the adjacent side bar 12 at its upper end and in a box 34 at its inner end, which box in turn is supported by a standard 35 resting on the bottom 11.

Figure 1:
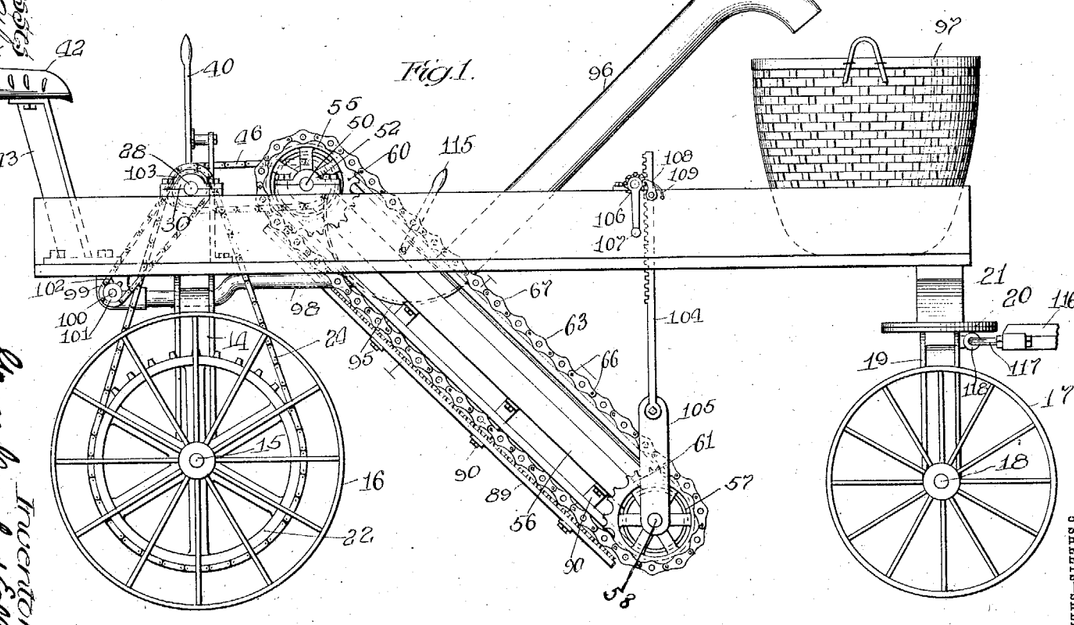
Figure 1 illustrates in side elevation a cotton harvester embodying my invention.
Figure 9:
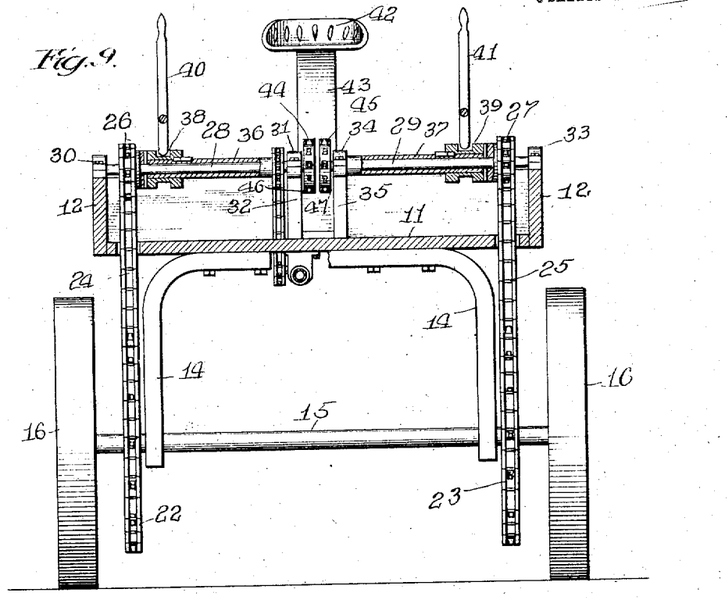
Fig. 9 is a transverse section of the machine.

The pinions 26 and 27 are rigid upon their respective shafts, which said shafts are provided with sleeves 36 and 37, and between the outer ends of these sleeves and the pinions 26 and 27 are ordinary clutches 38 and 39, the movable bars of which are splined upon the respective sleeves and by hand levers 40 and 41 are actuated to and out of engagement with the other and fixed portion rigidly secured to the sprockets whereby the power transmitting belts 24 and 25 may be both simultaneously and independently disengaged from and engaged with the power transmitting mechanism of the machine, to which end the hand levers 40 and 41 are within convenient reach of an operator in a seat 42 mounted on a post 43 supported from the bottom of the frame of the machine in the usual manner, as shown in Figs. 1 and 9.

Figure 2:
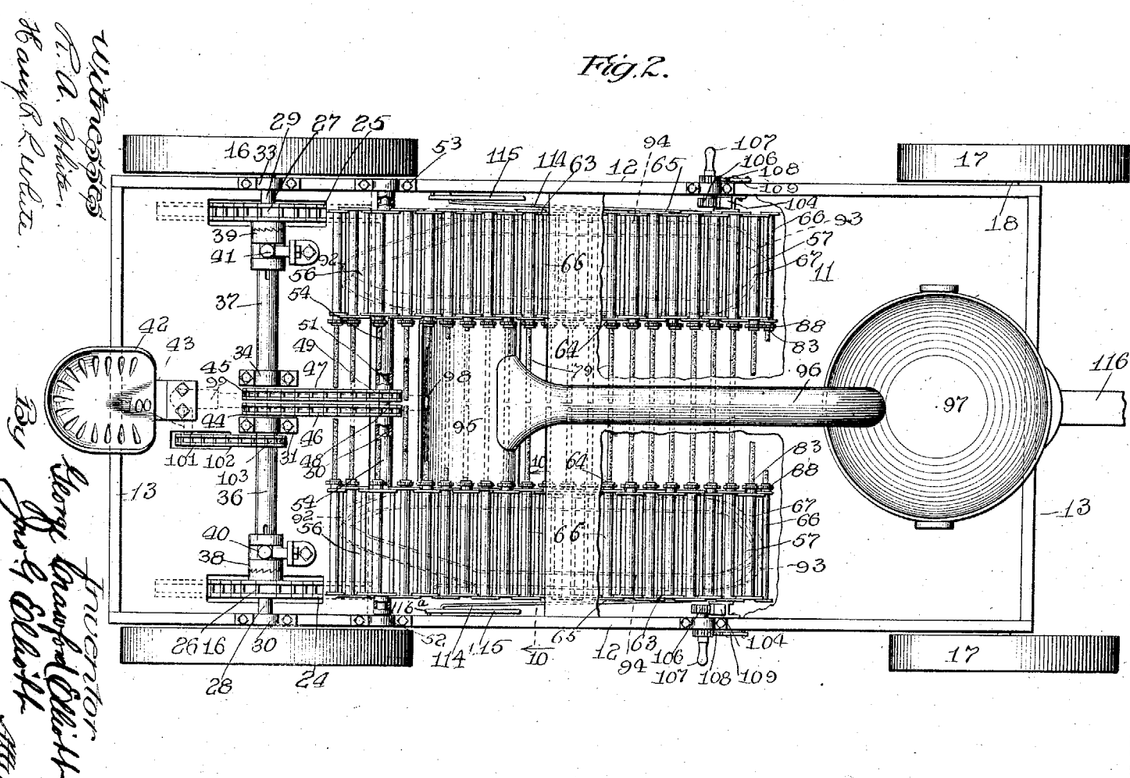
Fig. 2 is a top plan view of the same.

On the inner and opposing ends of the shafts 28 and 29 are respectively secured sprocket pinions 44 and 45, which, (see Figs. 1, 2 and 9), respectively form one end support for link belts 46 and 47, the other ends of which are respectively supported on sprocket pinions 48 and 49 on the opposing ends of shafts 50 and 51, the inner ends of these shafts being journaled in bearings supported by posts, (not shown), similar to those shown in Fig. 9 for the shafts 28 and 29 and their outer ends in boxes 52 and 53 mounted upon the side bars 12.

Figure 7:
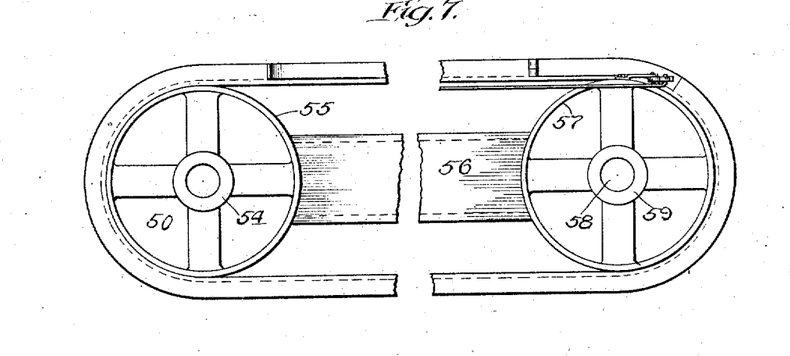
Fig. 7 is a side elevation of the camway directing the thrust movement of the picker stem.
Figure 8:
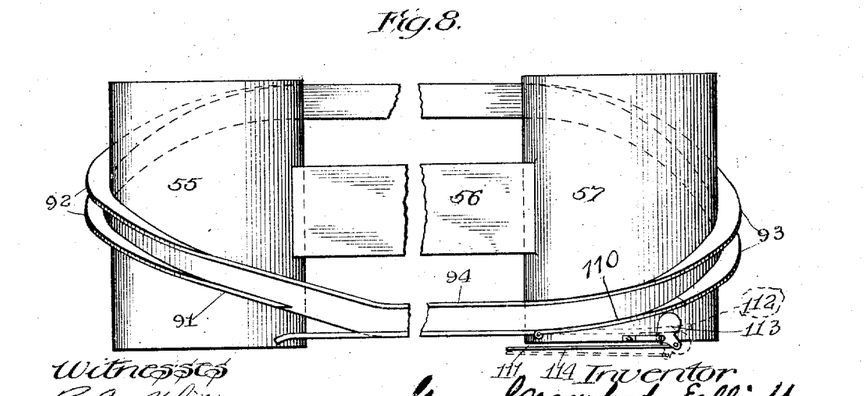
Fig. 8 is a top plan view of the same.
Figure 10:
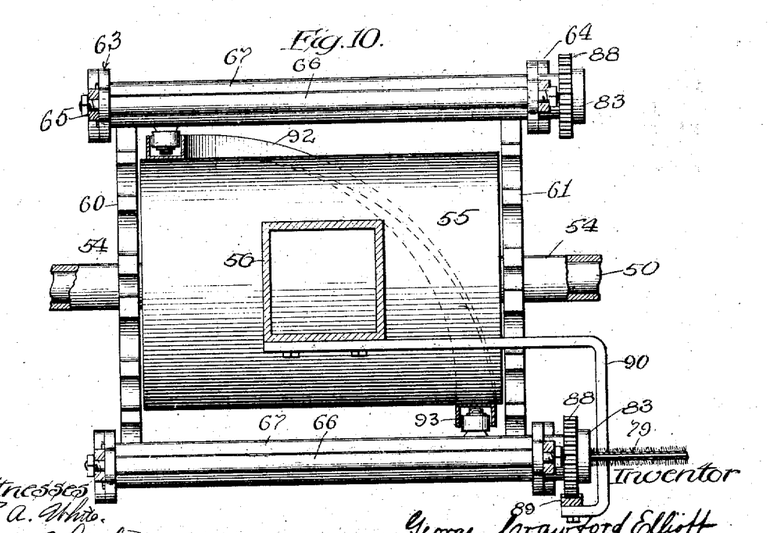
Fig. 10 is an enlarged detailed transverse section through one of the picker supporting frames.

Upon each of the shafts 50 and 51 are sleeves 54, 54, to which is secured, (see Fig. 10), a hollow cylinder 55 of large diameter from which projects a bar 56, (see Figs. 7 and 8), attached at one end to the cylinder 55 and attached at its other end to a similar hollow cylinder 57 in which, or in the hubs of which is journaled a shaft 58, (see Fig. 7), the cylinder 57 being provided with a hub 59 instead of an elongated sleeve 54, as is the cylinder 55. The cylinder 55 has at each end rigid upon its sleeve sprocket wheels 60 and 61 and likewise secured to the hub of the cylinder 57 are sprockets 62, 62, but one of which however, (see Fig. 1) is shown. The sprockets 60 and 61 of the sleeve 54 are connected with the sprockets 62, 62 on the hubs 59, respectively by linked belts, (see Fig. 2), 63 and 64.

Figure 3:
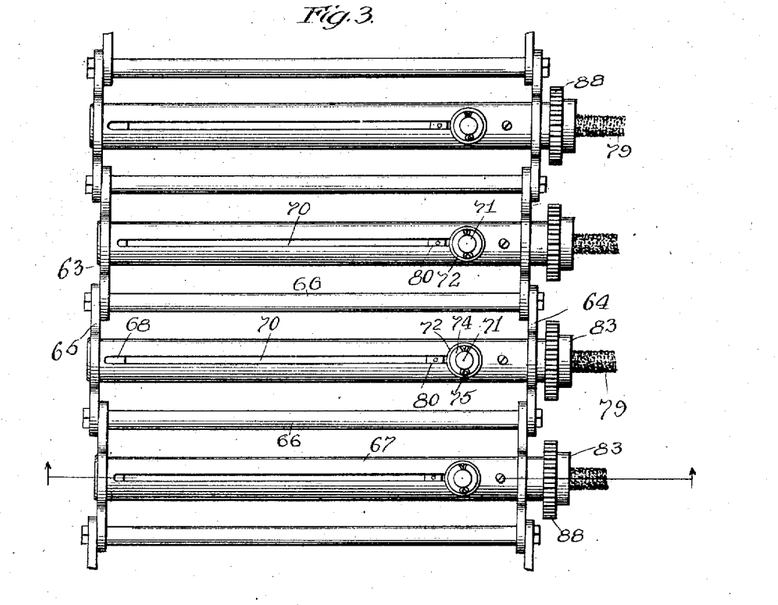
Fig. 3 is an enlarged detailed plan view of the picker-stems and their supporting cylinder or sheath.
Figure 5:
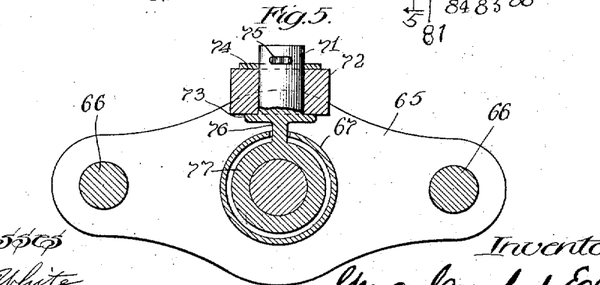
Fig. 5 is an enlarged cross section on the line 5—5 of Fig. 4.
Figure 6:
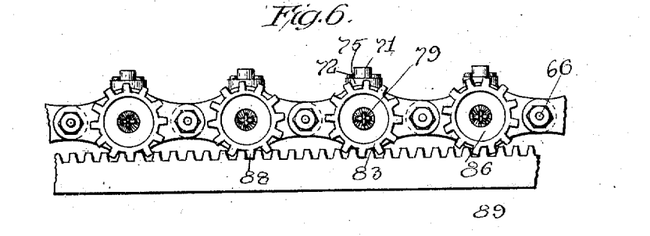
Fig. 6 is a detail front end elevation of several of the picker stems and their supports showing the means by which they are connected and actuated.

The belts 63 and 64, (see Figs. 1, 3 and 5,) may be formed of a number of sheet metal links, 65, pivoted together by rods 66 which extend transversely from belt to belt and serve not only as a means for connecting the opposing belts, but to maintain them in parallelism and uniformly parallel during movement. The directly opposing links of each belt are rigidly connected together by a hollow cylinder, hereinafter designated as a stripping sheath 67, because serving to inclose the picker stem and strip it of its cotton when withdrawn loaded from the bush.

Figure 4:
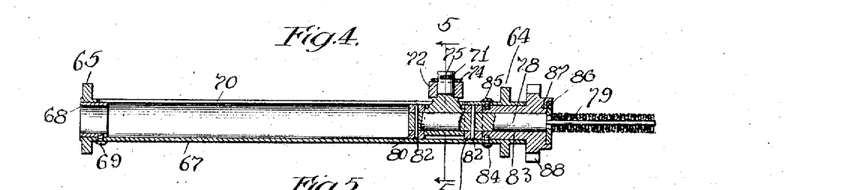
Fig. 4 is a central longitudinal section through one of the stripping sheaths and picker stems mounted thereon.

Stripping sheath 67, (see Fig. 4) has in its outer end a stop 68 comprising a short piece of tubing inserted in the sheath secured by a set screw 69 and serving to limit the inward thrust of the picker stem. In the stripping sheath 67 is a longitudinal slot 70 through which projects a lug 71, which, (see Fig. 5), is provided with an anti-friction roller 72 confined between the flange 73 rigid with the lug and a washer 74 held in place by a key 75. The lug 71 is provided with an extension consisting of a webbed portion 76 and a perforated portion 77 by means of which the lug is sleeved on the shank 78 of the picker stem 79, the lug being held against longitudinal movement on the shank by means of collars 80 and 81 secured against movement on the picker stem shank by pins 82, 82.

Bearing in the inner end of the stripping sheath 67 is a hub 83 free to turn therein but prevented from longitudinal movement by set screws 84 and 85 projecting through the wall of the stripping sheath into an annular groove in the periphery of the hub, the outer end of the hub being provided with a plate 86 countersunk in the end of the hub and rigidly secured by means of one or more set screws 87, the plate 86 being slotted to conform to the cross section of the picker stem and made angular in form for the purpose of preventing the rods of the picker stems turning on their individual axes from the time they are withdrawn from the bush until they are stripped of their cotton, the rotation of the picker stem about its own axis in the bush during the time of its projection in the bush being accomplished by means of a pinion 88 rigid upon the hub and adapted to engage, (see Figs. 1 and 10), a rack bar 89 supported by one or more bent bars 90 secured at their opposite ends to the bar 56 by screws, as shown in said figures.

In short, when picking cotton the picker stems move in a vertical line upwardly through the cotton bush and are revolved about their individual axes by the engagement of their pinions with their rack bar, but on the release of their pinions from the upper end of such rack bar the picker stems by means of the engagement of their anti friction rollers with the cam way, which will presently be described, are gradually withdrawn into their sheaths, with the result that the gathered cotton thereon is stripped from and bunched at the ends of the picker stems, in position for its transfer by air suction or other means to a suitable receptacle hereinafter described.

Supported by the cylinders 55 and 57, (see Figs. 7, 8 and 10), is an elliptical like camway 91 provided with opposing parallel flanges between which the lugs 71 constantly project throughout the revolution of their supporting belts, while in the meantime the roller 72 is in engagement with the edges of said flanges.

The edges of the flanges of the cam are, however, so constructed and arranged that as the pinions 88 of the picker stems successively engage the rack bar 89 and move to the opposite end thereof the picker stems are projected out of their stripping sheath into the bush and after disengagement from the rack bar are gradually drawn into the sheath to strip them of their cotton, to which end the cam is provided with opposing parallel flanges 92, 92, and 93, 93 toward its ends and with side flanges 94, the flanges 92 by their engagement with the roller 72 operating to withdraw the picker stems gradually into their stripping sheaths, and entirely so just before they have passed around the upper drum 55, when they entirely discharge their gathered cotton, (see Figs. 1 and 2) into a receptacle 95 after which and by the operation of the cam flanges 93, they are again gradually projected from their stripping sheath and entirely therefrom by the time the pinions 88 engage their rack bar 89 and the picker stems come in contact with the cotton bushes.

As fast as the cotton falls into the receptacle 95 it is blown through a pipe 96 into a basket 97 removably supported at the forward end of the machine, the blast being conducted, (see Figs. 1 and 2), through a pipe 98 and produced by an ordinary fan blower, not shown, but indicated at 99, on the shaft 100 of which is a pinion 101 actuated by a linked belt 102 on a pinion 103 secured to the power transmitting shaft 36.

For the purpose of adjusting the picker stems and their supports to cotton bushes varying in height and also for lifting them clear of the bushes, when desired, a rack bar 104, (see Figs. 1 and 2), is connected by a link 105 with a lower shaft 58 in such a position as to mesh with the pinion 106 on the side bars of the machine actuated by a crank arm 107 for raising and lowering the rack bar for withdrawing the picker stem support, as above described, a pawl 108 actuated by a spring 109 serving to lock the pinion and maintain the rack bar 104 in the desired adjustment.

There are occasions when it is desirable to continue the operation of the chain carriers of the picker stems and at the same time stop the reciprocation of the picker stems and maintain them wholly within their sheaths and for this purpose, (see Fig. 8), the lowermost side flange may be formed of a piece 110 hinged at 111 and actuated by an eccentric 113 and a rod 114 pivoted, (see Fig. 2), to a hand lever 115 attached by a pivot 116ª to the side bar 12 of the frame of the machine, there being a similar switch device for the opposing picker stem carriers and the arrangement of the parts being such that the switch may be operated by the driver of the machine.

As shown the machine may (see Figs. 1 and 2) be provided with a tongue 116 secured by a link 117 to an eye 118 on the bar 19, but it is proposed hereafter to use a motor for propelling the machine for transferring and operating purposes and which may be mounted on the machine.

In operation, when the machine is in a position straddling a row of cotton bushes containing ripe cotton the picker stems are adjusted to the bushes by raising or lowering, as may be, their supports through the medium of the rack bar 104 and its connecting and actuating devices, as above described, and after this is done the machine is then moved forward over the row of bushes thereby setting in motion the operating and guiding devices therefor with a result that as the machine moves forward the picker stems projecting into the bush are moved upwardly and backwardly, the speed of the belt carriers therefor being so timed that the picker stems have a translating movement, that is to say, a rotation about their individual axes while in the bush, and an upward and backward motion by which their movement with reference to the bushes is an outward and inward thrust at a right angle thereto so that they do not pull or drag on the bush when gathering the cotton therefrom, and owing to the character of the picker stems employed they cause no injury to the bush, the unripe bolls and the blossoms thereon. As soon as the picker stems have gathered their load they cease their rotation about their individual axes and then begin to recede into their stripping sheaths, while the stripper operates to gradually force the cotton from their shanks toward the point and then off the latter by the time they are in a position above the receptacle 95, whence the cotton is blown through the pipe 96 into a basket 97 for which when full another is substituted, but instead of a basket a removable sack may be employed.

As indicated, it is preferable to employ a brush picker stem made up of bristles, the detailed construction of which, however, and claims therefor are reserved for another application.

My invention and inventions are not limited to the details of construction herein shown and described in which they find embodiment, but include broadly the mechanism by which the objects herein set forth are attainable.

Having described my invention what I claim and desire to secure by Letters Patent, is:

1. A cotton harvester comprising in combination straddle row elongated endless carriers, disposed at an oblique angle with reference to the ground, a plurality of picker stems supported at intervals of and by said carriers at opposite sides of a row of cotton bushes, and means adjustably suspending the lower end of said carrier toward and from the bottom of a cotton bush, substantially as described.

2. A cotton harvester comprising in combination straddle row elongated endless carriers, lengthwise obliquely disposed with reference to a vertical line, picker stems arranged at intervals of and supported by said carriers at opposite sides of a row of cotton bushes, a shaft and sprocket wheels for and toward the lower end of said carrier, and means directly attached to said shaft for raising and lowering the lower end of said carrier, substantially as described.

3. A cotton harvester comprising in combination an elongated endless carrier, lengthwise disposed at an oblique angle with reference to a vertical line, a supporting shaft and sprockets for said carrier at the end thereof, a rack bar, a pinion supporting said rack bar, and a link connecting said rack bar directly with said shaft, substantially as described.

4. A cotton harvester comprising in combination elongated pivotally mounted endless straddle row carriers having substantially parallel side members extending at an oblique angle to a vertical line, picker stems supported by and at intervals of said carriers at opposite sides of a row of cotton bushes, means for rotating said picker stems at intervals upon their individual axes, a shaft and sprocket wheel supporting the lower end of said carrier, and means by which the shaft is directly suspended, and raised and lowered on the arc of a circle, substantially as described.

5. A cotton harvester comprising in combination a picker stem support, inclined endless carriers mounted thereon and picker stems mounted upon said carriers, a camway secured to said support and means connecting the picker stems therewith, whereby said picker stems move in a vertical line through and have a direct thrust into and out of a cotton bush, substantially as described.

6. A cotton harvester comprising in combination a picker stem support pivoted at its upper end and free to swing thereon, picker stems, and means whereby said picker stems are bodily carried about said support, a cam track secured to said support, means connecting the picker stems therewith, whereby the picker stems are gradually inserted and withdrawn from the bushes at a right angle thereto as they are carried about their support, a pinion on each picker stem and a rack bar engaging the pinions on the inserted picker stems whereby the picker stems are bodily carried about their supports and are revolved about their individual axes only when projected into a row of cotton bushes, substantially as described.

7. A cotton harvester comprising in combination a support inclined at an oblique angle relative to a cotton bush, an endless carrier mounted thereon, means for actuating said carrier, picker stems secured to said carrier, means for rotating said picker stems upon their individual axes throughout their engagement with the cotton bushes, means for withdrawing the picker stems therefrom and for stripping them of their cotton, a receptacle receiving the cotton stripped from the picker stems before they are again rotated, substantially as described.

8. A cotton harvester comprising in combination an endless carrier, a support therefor pivoted at one end, picker stems, a cam trackway actuating the picker stems into and out of a row of cotton bushes during their bodily movement with said carrier, a rack bar supported by said support, pinions on the picker stems engaging said rack bar, said rack bar being located adjacent the path of the pinion while the stems are projected into the cotton bush, whereby the picker stems are rotated about their individual axes when in a cotton bush and are maintained against axial rotation when out of the bush, means for stripping the cotton from the picker stems during their bodily downward movement, a receptacle, a fan blower actuated by the driving mechanism of the machine delivering an air blast to the receptacle and a pipe through which the cotton is discharged from the receptacle into a basket or other receiver, substantially as described.

9. A cotton harvester comprising in combination a picker stem carrier, a pivot toward the end thereof on which said carrier may be adjusted to cotton bushes varying in height for disposal of the ripe cotton, a ground wheel, means connecting said ground wheel with and actuating the carrier, stripping sheaths secured to said carrier, picker stems and means actuating them into and out of said sheaths, and a rack bar located adjacent the path of the picker stems by which the picker stems are rotated on their individual axes when projected from their stripping sheaths and are non-rotatable when out of the cotton bushes, substantially as described.

10. In a cotton harvester, a series of picker stems, an endless carrier supporting said picker stems, a support for said carrier pivoted at its upper end with its lower end free to be raised and lowered on said pivot, said support comprising an upper and lower drum and bar rigidly connecting said drums, a shaft passing through the lower drum and gears thereon supporting the lower end of the endless carrier and means toward the upper end of the carrier for actuating it and driving mechanism for actuating said means, substantially as described.

11. A cotton harvester comprising in combination an endless carrier, picker stems secured to said carrier, a support and driving mechanism for the carrier, a camway positively actuating the picker stems in thrusting them into and out of a cotton bush, a rack bar for rotating the picker stems upon their individual axes, and a switch in said camway whereby the picker stems may be prevented from engaging the rack bar, substantially as described.

12. A cotton harvester comprising in combination parallel linked belt carriers, a stripping sheath rigidly connecting opposing links of said belts, a picker stem, a lug thereon projecting from said sheath, a fixed camway engaged by said lug whereby the picker stem is moved inwardly and outwardly of said sheath, and a slotted stripping plate, whereby when the picker stem is moved inwardly of the sheath the gathered cotton will be stripped therefrom, substantially as described.

13. A cotton harvester comprising in combination an endless belt carrier consisting of two parallel linked belts, a tubular shaft rigidly connecting opposing links of said belts, a picker stem, a hub therefor rotatable in said shaft, a pinion on said hub and means for actuating the same to rotate the picker stem, a lug journaled on said stem, a fixed camway engaging said lug and whereby the picker stem is withdrawn into and projected from its shaft during the travel of the linked belts, substantially as described.

14. A cotton harvester comprising in combination parallel linked belts, means for simultaneously actuating the said belts, a series of tubular stripping sheaths rigidly connecting the opposing links of said belts, a longitudinal guide-slot in each stripping sheath, a picker stem, a lug journaled on said picker stem and projected through said slot, a roller on said lug, a fixed camway engaged by said lug and roller, a hub projecting into the stripping sheath, a pinion thereon and a rack bar whereby the hub and picker stem are simultaneously rotated about their individual axes at predetermined times, substantially as described.

15. In a cotton harvesting machine, the combination of a picker-supporting frame, a cam track carried thereby, an endless chain, pickers carried by said chain, a rack bar, means for rotating the pickers from the rack bar, and connections between the pickers and the cam track by which the pickers as they are carried around by the chain are caused to move laterally into line with a row of plants and then laterally away from said row.

16. In a cotton harvesting machine, the combination of a picker-supporting frame, an endless chain carried thereby, picker-supporting bars attached to the chain, sliding bars adapted to move laterally in the picker-supporting bars, a cam track operatively connected with the sliding bars by means of which they are given their lateral movements, and means for rotating the pickers about their axes.

17. In a cotton harvesting machine, the combination of a series of pickers, an endless chain by which they are carried, means for rotating each picker about its own axis, and means for operating the chain to move the pickers downwardly into the plants and upwardly from them and also for moving the pickers laterally just before and just after their entrance into and withdrawal from the plants.

18. In a cotton picking machine, a plurality of picker members having lateral, shifting movement on the machine frame into and out of operative position and also bodily movement on the machine frame when in operative position in an upward and rearward direction, and means for giving bodily motion to said members giving thereto rearward movement relative to the machine frame at the same rate of speed as that of the advance movement of the machine, and resulting upward movement in a substantially vertical path.

19. A cotton picking machine comprising a machine frame provided with supporting wheels and constructed to straddle a row of plants, and two sets of picker fingers, one on each side of the machine, the fingers in each set being arranged horizontally with their free ends directed inwardly, said picker fingers having, when in operation on the cotton plants, movement on the machine frame in an upward and rearward direction and means for giving bodily movement to said fingers at such rate of speed that each finger will have rearward movement on the machine frame at the same rate of speed as that of the advance movement of the machine and a resulting upward movement in a substantially vertical path.

20. A cotton picking machine embracing a plurality of picker members having lateral shifting movement into and out of operative position and also bodily movement in a continuous looped path, a portion of which is upwardly and rearwardly inclined, said members having upward and rearward movement while in operative position and while traversing said upwardly and rearwardly inclined portion of said path and driving means giving to said members bodily movement at such rate of speed that each member, while traversing said inclined portion of said looped path, will have rearward movement relatively to the machine frame at the same rate of speed as that of the advance movement of the machine.

21. A cotton picking machine comprising a machine frame, a plurality of picker members, an endless belt carrier supporting said picker members, said picker members having lateral shifting movement on said carrier into and out of operative position, sprocket wheels supporting said carrier with a part or lap thereof in an upwardly and rearwardly inclined position, and means for driving said carrier giving to the said part or lap thereof motion in an upward and rearward direction.

22. A cotton picking machine, comprising a machine frame, a plurality of horizontally arranged, rotative picker fingers, an endless belt carrier supporting said fingers and in which the said fingers have endwise movement into and out of operative position, said carrier being arranged in a vertical plane, parallel with the direction of motion of the machine, a part of said carrier having movement in an upwardly and rearwardly inclined direction, and means giving to the said fingers endwise movement on said carrier adapted to maintain said fingers in their operative position during their upward and rearward movement and in a retracted position during their return movement.

23. A cotton picking machine comprising a machine frame, a plurality of horizontally arranged, rotative picker fingers, an endless belt carrier supporting said picker fingers, wheels supporting said carrier with a part or lap thereof in an upwardly and rearwardly inclined position, means for driving said carrier giving to the said part or lap thereof motion in an upward and rearward direction, and means for giving rotative movement to the picker fingers embracing gear pinions mounted on the carrier and through which the picker fingers have endwise sliding movement and a rack bar on the machine frame which is engaged by said gear pinions during the upward and rearward movement of the fingers.

24. A cotton picking machine comprising a machine frame, a plurality of horizontally arranged, rotative picker fingers, an endless belt carrier supporting said picker fingers and in which said fingers have endwise sliding and rotative movement, wheels supporting said carrier with a part or lap thereof in an upwardly and rearwardly inclined position, and means for giving endwise movement to the said fingers, embracing actuating arms pivotally connected with the picker fingers and movable endwise therewith, and tracks on the machine frame, acting on said actuating arms to give endwise movement to the fingers as the latter are moved with the carrier.

25. A cotton picking machine comprising a machine frame, a plurality of horizontally arranged, rotative picker fingers, an endless belt carrier supporting said picker fingers and in which the same have endwise sliding and rotative movement, means for giving endwise movement to the picker fingers, embracing actuating arms pivotally connected with the picker fingers and movable endwise therewith, tracks on the machine frame acting on said actuating arms to give endwise movement to the fingers in the travel of the carrier, and means for giving rotative movement to the fingers embracing rotative sleeves mounted on the carrier through which the picker fingers have endwise sliding movement and which turn with said fingers, and means acting on said sleeves during the traveling movement of the carrier to give rotative motion to said sleeves and the picker fingers.

26. In a cotton picking machine, an endless belt carrier comprising two chain belts and transversely arranged casing tubes attached at their ends to the links of said chain belts, and picker fingers having rotative and endwise movement in said casing tubes.

27. In a cotton picking machine, an endless belt carrier provided with transversely arranged casing tubes, picker fingers having rotative and endwise movement in said tubes, sleeves mounted to rotate on the said tubes and provided with stripper plates engaging the picker fingers, means acting on said sleeves to give rotary movement thereto, and means acting on the fingers to give endwise movement to the same.

28. In a cotton picking machine, an endless belt carrier provided with transversely arranged casing tubes, each provided with a longitudinal slot, picker fingers, each having rotative and endwise movement in one of said casing tubes and provided with cylindric heads having sliding and rotative engagement with the casing tubes, actuating arms having rotative engagement with said head and which extend outwardly through slots in the casing tubes, means acting on said actuating arms to give endwise movement to the picker fingers, and means engaging the picker fingers, giving rotative movement to the same.

29. In a cotton picking machine, an endless belt carrier, consisting of two chain belts, transversely arranged, longitudinally-slotted casing tubes, secured at their ends to the links of said chain belts, picker fingers having endwise and rotative movement in said casing tubes, said fingers being provided with cylindric heads having sliding and rotative engagement within said tubes, actuating arms having rotative engagement with said heads and which extend outwardly through the slots in the casing tubes, and tracks on the machine frame, acting on said actuating arms in the traveling movement of the carrier, to give endwise movement to the picker fingers.

30. In a cotton picking machine, an endless belt carrier consisting of two chain belts, transversely-arranged, longitudinally-slotted casing tubes, secured at their ends to the links of said chain belt, picker fingers having endwise and rotative movement in said casing tubes, said fingers being provided with cylindric heads having sliding and rotative engagement with said tubes, actuating arms with which said heads have rotative engagement and which extend outwardly through the slots in the casing tubes, tracks on the machine frame acting on said actuating arms in the traveling movement of the carrier to give endwise movement to the picker fingers, rotative sleeves mounted upon and extending endwise from the casing tubes, said sleeves being provided with gear pinions and with stripper plates, and a rack bar in the machine frame adapted for engagement with said gear pinions.

31. In a cotton picking machine, a plurality of picker fingers, an endless belt carrier on which said fingers have endwise sliding and rotative movement, supporting wheels sustaining said carrier in an inclined position, and guide bars on the machine frame extending longitudinally below the upper and lower laps of the carrier to sustain the parts of the same between said supporting wheels.

32. In a cotton picking machine, the combination with a plurality of picker fingers, of an endless belt carrier in which said fingers have endwise sliding and rotative movement, actuating arms extending laterally from the inner ends of the picker fingers and with which the same have rotative engagement, supporting wheels for the carrier sustaining the same in an inclined position, tracks on the machine frame arranged parallel with the upper and lower laps of the belt of the carrier, and operating on said actuating arms to hold the picker fingers in an advanced or retracted position, and obliquely disposed tracks arranged concentrically with said supporting wheels for effecting lateral shifting movement of the said picker fingers.

33. A cotton harvester comprising in combination picker stems, a picker stem support pivoted at its upper end and free to swing thereon, means for carrying the picker stems bodily about said support, a cam track secured to the support and means connecting the picker stems therewith whereby the picker stems are gradually inserted and withdrawn from the bushes at a right angle thereto, a pinion on each of said picker stems and a rack bar engaging said pinion while the picker stem is projected whereby the picker stems are rotated about their individual axes only when projected into a row of cotton bushes.

34. A cotton harvester comprising in combination a picker stem carrier, a pivot toward the end thereof on which said carrier may be adjusted to cotton bushes varying in height for disposal of the ripe cotton, a ground wheel, means connecting the said ground wheel with and actuating the carrier, stripping sheaths secured to said carrier, picker stems and means actuating them into and out of said sheaths, and means including a rack bar whereby the picker stems are rotated on their individual axes when projected from their stripping sheaths and are non-rotatable when out of the cotton bushes.

35. A cotton picking machine provided with a plurality of horizontally arranged picker members having endwise lateral movement to carry them into and out of position for action upon the plants, and also having, when in position for operation on the plants, movement on the machine frame in a straight inclined path in an upward and rearward direction.

36. In a cotton picking machine, a plurality of horizontally arranged picker members having endwise lateral movement to carry them into and out of position for action upon the plants, and having, when in position for operation on the plants, motion on the machine frame in a straight, inclined path in an upward and rearward direction, and means for giving bodily motion to said members, giving to each member rearward movement relatively to the machine frame at the same rate of speed as that of the machine in its advance movement and a resulting upward movement in a substantially vertical path.

37. A cotton picking machine provided with a plurality of horizontally arranged picker members having endwise lateral movement into and out of position for action upon the plants, and having bodily movement on the machine frame in a continuous looped path, a part of which is straight and inclined upward and rearwardly, and means for giving bodily movement to said fingers adapted to carry the same in an upward and rearward direction when the members are in position for action upon the plants and are traversing the upwardly and rearwardly inclined portion of said path.

38. A cotton picking machine provided with a plurality of horizontally arranged picker members having lateral endwise shifting movement into and out of position to act upon the plants, and also bodily movement in a continuous looped path, a part of which is straight and inclined upwardly and rearwardly, means for giving endwise shifting movement to the said members adapted to advance the same into operative position before they reach the lower end of said inclined part of said path and to retract the same into inoperative position when they have reached the upper end of said inclined portion of said path, said bodily movement of the said members being in an upward and rearward direction when the members are in operative position and are traversing the upwardly inclined straight portion of said path.

39. A cotton picking machine embracing a plurality of horizontally arranged picker members having endwise lateral movement to carry them into and out of position for action upon the plants, and also bodily movement in a continuous looped path, a portion of which is straight and upwardly and rearwardly inclined, means for giving bodily movement to said picker members in such direction that they have upward and rearward movement, while traversing said upwardly and rearwardly inclined straight portion of said path, at such rate of speed that each member will have a rearward movement relatively to the machine frame at the same rate of speed as that of the machine in its advance movement, and means for giving lateral shifting movement to said members acting to advance them into operative position before they reach the lower end of said upwardly and rearwardly inclined path and to shift them into inoperative position when they begin their return movement toward the lower and forward end of said inclined portion of said path.

40. A cotton picking machine comprising a machine frame, a plurality of horizontally arranged picker members, and an endless belt carrier in which said members are mounted, said carrier being arranged in a vertical plane parallel to the direction of movement of the machine, and a portion of said carrier being inclined upwardly and rearwardly and having movement in an upward and rearward direction in a straight path, and means for actuating said carrier giving to the picker members, while on the upwardly and rearwardly inclined portion of said carrier, rearward movement relatively to the machine frame at the same rate of speed as that of the advance movement of the machine.

In witness whereof, I have hereunto set my hand and affixed my seal this 26th day of September A. D. 1908.

GEORGE CRAWFORD ELLIOTT. [L. S.]

Witnesses:
M. G. FITZSIMMONS,
JNO. G. ELLIOTT.